United States Patent [19]

Dömer

[11] 4,335,923
[45] Jun. 22, 1982

[54] BEARING HOUSING SUPPORT

[75] Inventor: Wolfgang Dömer, Schneisingen, Switzerland

[73] Assignee: BBC Brown, Boveri & Company Limited, Baden, Switzerland

[21] Appl. No.: 186,548

[22] Filed: Sep. 12, 1980

[30] Foreign Application Priority Data

Oct. 3, 1979 [CH] Switzerland ............... 8911/79

[51] Int. Cl.³ ............... F16C 35/02; F16C 23/02
[52] U.S. Cl. ............... 308/15; 308/25; 308/58; 248/656
[58] Field of Search ............... 308/15, 22, 25, 27, 308/29, 58, 59, 245, DIG. 15; 248/656, 661

[56] References Cited

U.S. PATENT DOCUMENTS

| 2,869,936 | 1/1959 | Federn | 308/22 |
| 3,504,954 | 4/1970 | Robson | 308/58 |
| 3,799,482 | 3/1974 | Bellati et al. | 308/25 |
| 4,008,926 | 2/1977 | Belperin | 308/15 |

FOREIGN PATENT DOCUMENTS

| 85845 | 4/1896 | Fed. Rep. of Germany | 308/59 |
| 903197 | 2/1954 | Fed. Rep. of Germany | 308/15 |
| 546959 | 11/1922 | France | 308/22 |
| 394347 | 6/1933 | United Kingdom | 308/59 |

Primary Examiner—Richard R. Stearns
Attorney, Agent, or Firm—Werner W. Kleeman

[57] ABSTRACT

To simplify the erection of bearing housing supports especially for the purpose of omitting the base plate which up to the present has been used for quite some time, the invention proposes fixing the foundation plates directly to the foundation. These foundation plates take-up the vertical adjustments, and the adjustment elements needed for such purpose, together with the horizontal fixation means for the bearing housing consituted by holding blocks or elements and adjustment bolts, can be adjusted in all planes.

6 Claims, 4 Drawing Figures

BEARING HOUSING SUPPORT

BACKGROUND OF THE INVENTION

The present invention relates to a new and improved construction of a bearing housing support, especially for turbomachines, which is of the type comprising a foundation, foundation plates with foundation anchors and adjustment elements.

With the state-of-the-art constructions of bearing housing supports for turbomachines, for instance as disclosed in the German Pat. No. 2,635,984, the bearing blocks are supported upon a base plate which is connected with the foundation. The vertical forces exerted upon the bearing block are transmitted by means of the base plate to the foundation. It is for this reason that the base plate must be designed to be particularly sturdy, something which becomes quite costly when there are involved turbomachines of considerable output.

Furthermore, with such type system designs it is considered to be a limitation that the bearing housing must be aligned exactly in relation to the base plate, in order that the bearing block exerts a supporting action at the entire contact or support surface. Equally, the support bolts below the bearing housing must all be uniformly tightened and this procedure is extremely time-consuming.

Furthermore, from Swiss Patent No. 533, 795 there has become known to the art a bearing block support arrangement wherein tension bolts piercingly extend with play through the bearing blocks and an intermediate plate and are anchored at the machine foundation.

With this arrangement the heretofore conventional base plate is replaced by an intermediate plate formed of sheet metal, simultaneously serving as a friction or sliding surface. What is considered to be a short coming with this design is that here also there is required uniform tightening of all of the tensioning bolts over the entire contact or support surface.

SUMMARY OF THE INVENTION

Therefore, with the foregoing in mind it is a primary object of the present invention to provide a new and improved construction of a bearing housing support which is not associated with the aforementioned shortcomings and limitations of the prior art constructions.

Another and more specific object of the present invention aims at providing a new and improved construction of a bearing housing support wherein there is no longer necessary the use of base plates which heretofore have been required up to the present time, and thus, there can be reduced the number of parts which are arranged in superimposed relationship between the foundation and the turbomachine and there can be increased the stability of the arrangement.

Now in order to implement these and still further objects of the invention, which will become more readily apparent as the description proceeds, the bearing housing support of the present development is manifested by the features that the foundation plates are fixed upon the foundation, without the use of a base plate, and these foundation plates support the adjustment or positioning elements for the vertical adjustment, and additionally, the adjustment elements together with the horizontal fixation means, composed of holding blocks or elements and adjustment bolts, are arranged such that the bearing housing can be adjusted in all planes.

A notable advantage of the construction of this invention resides in the fact that due to the omission of the base plate the bearing housing reposes only upon a few, exactly defined points, so that the alignment operations, during the new assembly or mounting of the equipment, and also the post-alignment during repair or revision work, is appreciable simplified. Due to the arrangment of the holding or retention blocks the bending moment acting upon such holding blocks is small due to the small lever arm.

According to an advantageous further design of the invention, the foundation is formed of concrete in which there have been cast the holding or retention blocks or elements and the foundation plates are connected by a suitable adhesive bond with the foundation.

Due to the adhesive bonding of the foundation plates with the concrete foundation, while using a conventional adhesive for this purpose, there can be obtained in a most simple manner attachment of such foundation plates. Furthermore, by virtue of the combination of the adjustment elements with the foundation plates there is rendered superfluous an exact alignment of the foundation plates.

If the foundation consists of steel then it is recommended to connect the foundation plates and the holding blocks in a simple manner with the foundation, without any special alignment work, by welding.

According to a further advantageous construction the engagement surfaces of the holding blocks with which engage the adjustment bolts or equivalent structure are advantageously constructed to have a four-cornered or square configuration.

This design of the engagement surfaces of the holding blocks enables using simple threaded bolts or screws which can be beneficially employed as the adjustment bolts and allow for adjustment of the bearing blocks in all planes.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 2a is fragmentary detail view of part of the bearing housing with a holder or retention block or element attached, for instance by welding, or a steel plate.

DETAILED DESCRIPTION OF THE PREFERRED EMBODIMENTS

Figure 1:
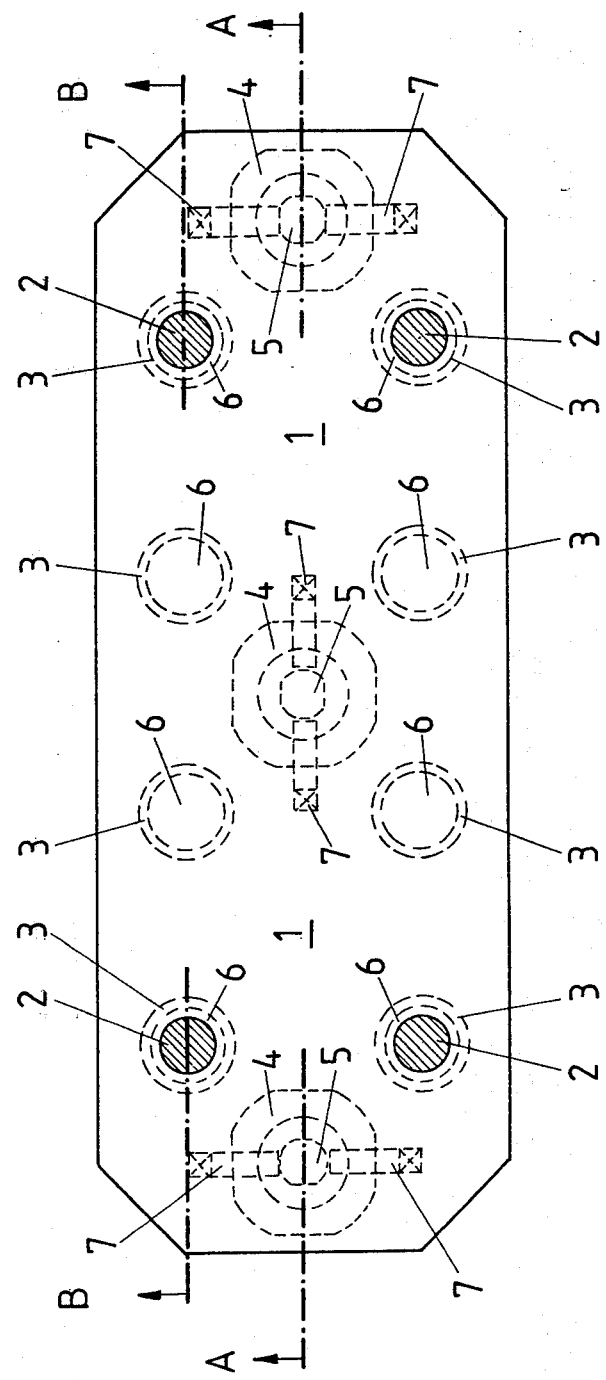
FIG. 1 is a top plan view of a bearing housing used in the bearing housing support arrangement of the invention.

Describing now the drawings, and turning attention particularly to FIG. 1 reference character 1 designates a bearing housing, for instance a turbomachine, through which piercingly extend foundation anchors 2. These foundation anchors 2 are attached in conventional fashion in a foundation 10, as best seen by referring to FIGS.

2 and 3, and thus fix the bearing housing 1 in place. This bearing housing 1 bears upon foundation plates 3 at further exactly defined points and is adjustably constructed by providing fixation elements or means 5 arranged upon the holding or retention blocks 4 or equivalent structure. Threaded adjustment disks or plates 6 are provided upon the foundation plates 3, by means of which it is possible to align or positionally adjust the bearing housing 1 in vertical direction. Engaging at the fixation elements 5 are the adjustment or positioning bolts 7 or equivalent adjustment elements, by means of which the bearing housing 1 can be fixed and adjusted in horizontal direction.

Figure 2:
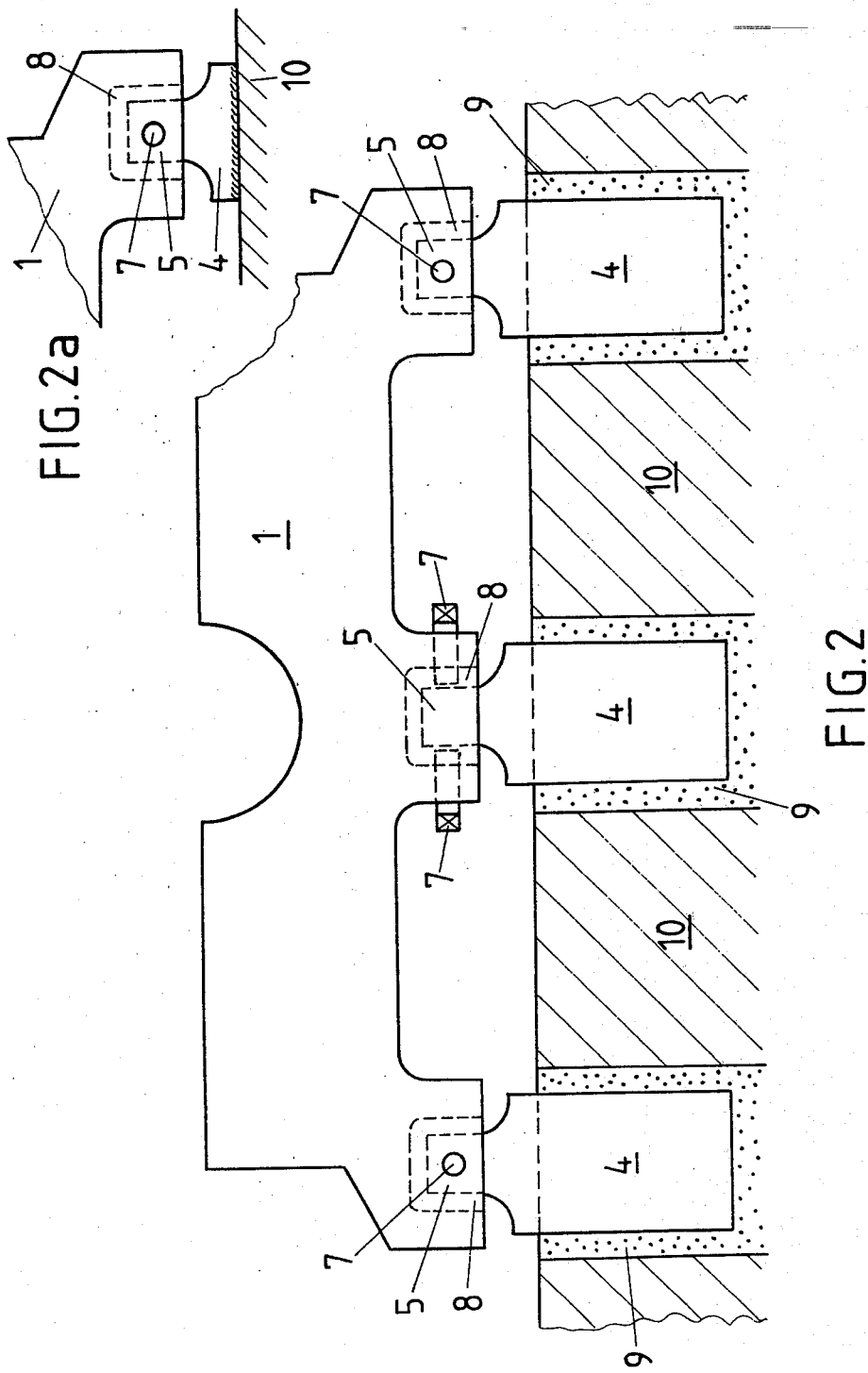
FIG. 2 is a longitudinal sectional view through the bearing housing of FIG. 1, taken substantially along the section line A—A thereof.

Turning attention now to FIG. 2, reference character 1 again designates the bearing housing which is provided at its underside confronting the foundation 10 with receiver portions 8, for instance in the form of receiving recesses, into which protrude the fixation elements 5 of the holding or retention blocks 4. These holding blocks 4 are cast or otherwise appropriately fixed at recesses or cavities 9 of the foundation 10 by means of a suitable binder, preferably a synthetic resin or plastic mortar.

With the construction of holding blocks or elements 4 and the foundation 10 as shown in FIG. 2a, these holder or holding blocks 4 are welded to the foundation 10 which is here formed of steel, so that the holding blocks 4 can be dimensioned to be appropriately short.

Figure 3:
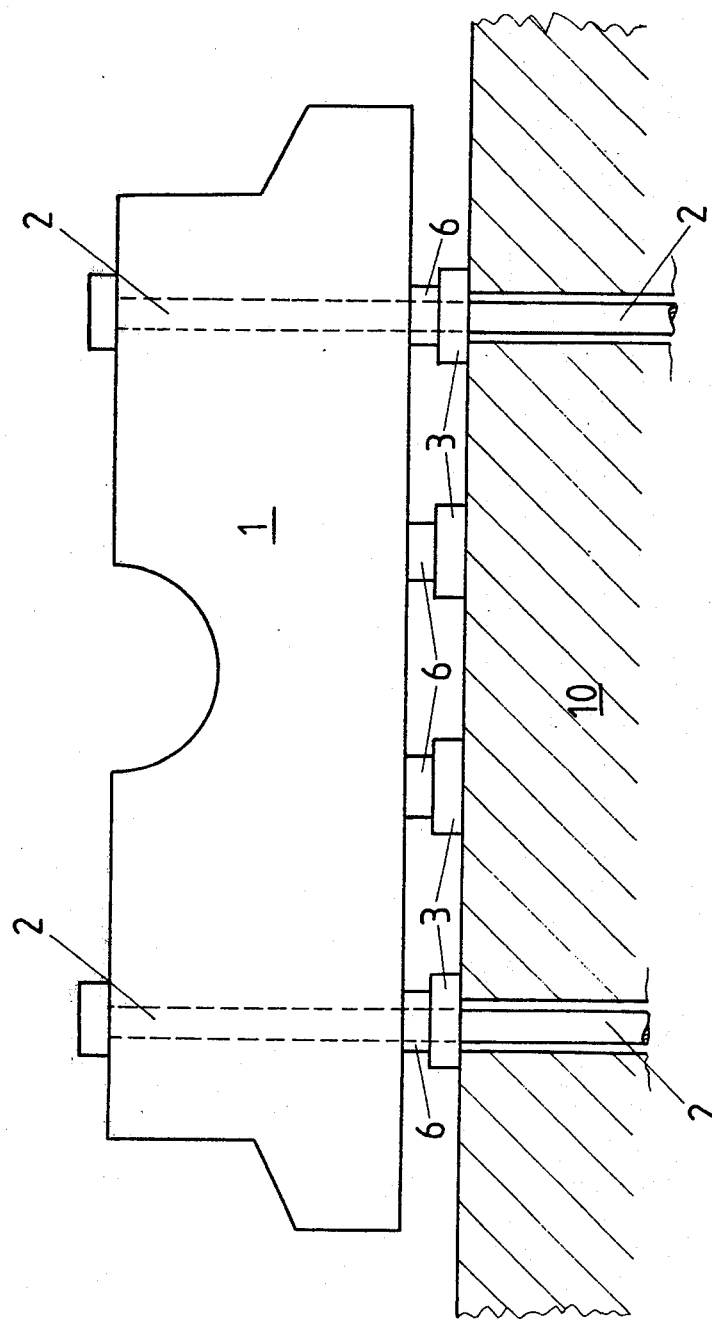
FIG. 3 is a further longitudinal sectional view through the bearing housing shown in FIG. 1, taken substantially along the section line B—B thereof.

FIG. 3 illustrates a sectional view of the arrangement of FIG. 1, taken substantially along the section line B—B thereof, wherein there will be seen the foundation plates 3 which are adhesively bonded to the foundation 10 along with their threaded adjustment disks 6. The outer foundation plates 3 of the showing of FIG. 3 are pierced by foundation anchors 2 or equivalent structure, which are anchored in known manner in the foundation 10.

Due to the combination of the foundation plates 3 which are adhesively bonded to the foundation 10, together with their threaded adjustment disks 6, as well as the holding blocks or elements 4 provided with the fixation elements or portions 5, wherein such fixation elements or portions 5 advantageously are structured as four-cornered parts and with which engage the adjustment bolts or elements 7, there is, firstly, possible a simple assembly of the bearing housing 1, and additionally, the bearing housing 1 can be displaced in all planes, for instance it can be readily slightly tilted, turned and so forth, without there being needed a prior exact alignment in relation to the foundation 10. Hence, the bearing housing 1 can be attached at a few, exactly defined points, while omitting the heretofore employed conventional base plate, something which is particularly advantageous if there is possibly needed at a later point in time post-adjustment or revision work at the equipment. Also, there is simultaneously avoided the need for any exact truing or planing or other machining work, for instance surface grinding of the underside of the bearing housing 1, and the support of contact surface of the base plate.

While there are shown and described present preferred embodiments of the invention, it is to be distinctly understood that the invention is not limited thereto, but may be otherwise variously embodied and practiced within the scope of the following claims.
ACCORDINGLY,

What I claim is:

1. A bearing housing support arrangement, especially for turbomachines, comprising:
    a foundation;
    foundation plates;
    a bearing housing;
    means for fixing said foundation plates directly to said foundation;
    adjustment elements supported on said foundation plates for vertically adjusting said bearing housing;
    said bearing housing being supported by means of said adjustment elements upon said foundation plates on said foundation;
    horizontal fixing means for horizontally fixing said bearing housing;
    said horizontal fixing means comprising holding blocks and adjustment members;
    said holding blocks being mounted on the foundation and being engaged by said adjustment members;
    said adjustment elements for the vertical adjustment of said bearing housing cooperating with said foundation plates and said foundation and said horizontal fixing means cooperating with said bearing housing serving for adjustment of the bearing housing in all planes.

2. The bearing housing support arrangement as defined in claim 1, wherein:
    said adjustment members comprise adjustment bolts.

3. The bearing housing support arrangement as defined in claim 1, wherein:
    said foundation is formed of concrete;
    said means for directly fixing the foundation plates to said foundation comprises adhesive bonding means; and
    said holding blocks being secured to said foundation.

4. The bearing housing support arrangement as defined in claim 1, wherein:
    said foundation comprises a steel foundation; and
    said foundation plates and holding blocks are welded to said foundation.

5. The bearing housing support arrangement as defined in claim 1, wherein:
    said holding blocks have engagement surfaces at which engage said adjustment members of said horizontal fixing means; and said engagement surfaces possessing a substantially four-cornered configuration.

6. The bearing housing support arrangement as defined in claim 1, wherein:
    said adjustment elements for the vertical adjustment comprise foundation anchors which piercingly extend through said foundation plates.

* * * * *